United States Patent Office 3,845,064
Patented Oct. 29, 1974

3,845,064
PIPERIDINETHIOAMIDES
Adrian Charles Ward Curran, Mortimer, Reading, England, assignor to John Wyeth & Brother Limited, Taplow Maidenhead Berkshire, England
No Drawing. Filed Oct. 24, 1972, Ser. No. 299,995
Int. Cl. C07d 29/36, 31/50
U.S. Cl. 260—293.85                                                    5 Claims

ABSTRACT OF THE DISCLOSURE

The invention provides in one aspect a pharmaceutical composition comprising a compound of formula I

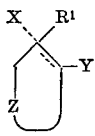

I or an acid addition salt thereof wherein Z is selected from

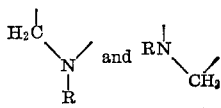

where R is selected from hydrogen, lower alkyl, aryllower-alkyl and loweralkanoyl, $R^1$ is selected from hydrogen, lower alkyl, aryl and arylloweralkyl, the dotted line in the ring represents an optional double bond; X is selected from hydrogen, hydroxyl and the group $SR^3$, where $R^3$ is selected from hydrogen, loweralkyl, aryl and aryllower-alkyl, but when formula I contains a double bond in the ring X is absent, Y is selected from cyano and $CSNHR^2$ wherein $R^2$ is selected from hydrogen and loweralkyl, with the proviso that when Y is cyano and X is $SR^3$, then $R^3$ is other than hydrogen. Novel thioamides and nitriles of formula I are also provided in another aspect of the invention.

The invention relates to novel pharmaceutical compositions containing heterocyclic compounds, to novel heterocyclic compounds and processes for preparing them.

The invention provides a pharmaceutical composition comprising a pharmaceutically acceptable carrier and a compound of formula I

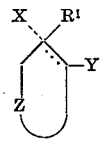

I or an acid addition salt thereof, wherein Z is

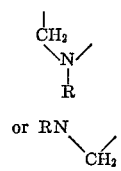

wherein R is hydrogen an alkyl or aralkyl group either of which may be substituted, or an acyl group, $R^1$ is hydrogen, or an alkyl, aryl or aralkyl group any of which may be substituted; the dotted line in the ring represents an optional double bond; X is hydrogen, the group $SR^3$, where $R^3$ is hydrogen, or an alkyl, aryl or aralkyl group any of which may be substituted, or X is an hydroxy group which may be etherified or esterified but when formula I contains a double bond in the heterocyclic ring X is absent, Y is a cyano group or the group $CSNHR^2$ where $R^2$ is hydrogen, or an alkyl, aryl or aralkyl group, any of which may be substituted, with the proviso that when Y is cyano and X is $SR^3$, then $R^3$ is other than hydrogen.

The compounds represented by formula I are therefore those of formula Ia and formula Ib

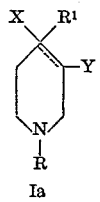 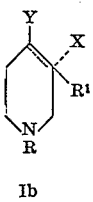

Ia                Ib wherein the radicals X, Y, $R^1$, R and the dotted lines have the same significance as discussed in connection with formula I.

When any of R, $R^1$, $R^2$ or $R^3$ is an alkyl group it is preferred that this is a lower alkyl radical, which may be a straight or branched chain, having from 1 to 6 carbon atoms, e.g. methyl, ethyl, propyl or butyl. The term alkyl radical is also intended to embrace cyclic alkyl radicals e.g. cyclobutyl, cyclopentyl and cyclohexyl. When any of R, $R^1$, $R^2$ or $R^3$ is an aralkyl group it is preferred that this is an aryl-loweralkyl group where the lower alkyl portion may be as discussed above for a lower alkyl group. The alkyl groups may be substituted e.g. by a halogen atom or an alkoxy group.

The preferred aryl groups for $R^1$, $R^2$ or $R^3$ when aryl or for the aryl portion of an aralkyl group are phenyl groups. The aryl groups or portion may be substituted for example by a halogen atom, or an alkyl, alkoxy, nitro or haloalkyl (e.g. trifluoromethyl) radical.

Preferably Y is the group $CSNH_2$ and preferably X is also $SR^3$ e.g. SH.

When R is an acyl group this may be one derived from an aliphatic carboxylic acid which may be unsaturated and/or may be substituted e.g. by a substituted or unsubstituted aryl group. Such acyl groups include lower alkanoyl e.g. acetyl and p-nitrocinnamoyl. Alternatively R may be an aroyl radical e.g. benzoyl, which may be substituted, e.g. by a nitro group.

The compounds of formula (I) can form acid addition salts with inorganic acids e.g. hydrochloric, hydrobromic, sulphuric and nitric acid or organic acids e.g. oxalic, fumaric, maleic and tartaric acid.

The compositions of the invention include the acid addition salts mentioned above.

For the pharmaceutical carrier any suitable carrier known in the art can be used to prepare the pharmaceutical compositions. In such a composition, the carrier may be a solid, liquid or mixture of a solid and a liquid. Solid form compositions include powders, tablets and capsules. A solid carrier can be one or more substances which may also act as flavouring agents, lubricants, solubilisers, suspending agents, binders, or tablet-disintegrating agents; it can also be an encapsulating material. In powders the carrier is a finely divided solid which is in admixture with the finely divided active ingredient. In tablets the active ingredient is mixed with a carrier having the necessary binding properties in suitable proportions and compacted in the shape and size desired. The powders and tablets preferably contain from 5 to 99%, preferably 10 to 80% of the active ingredient. Suitable solid carriers are magnesium carbonate, magnesium stearate, talc, sugar, lactose, pectin, dextrin, starch, gelatin, tragacanth, methyl cellulose, sodium carboxymethyl cellulose, a low melting wax, and cocoa butter. The term "composition" is intended to include the formulation of an active ingredient with encapsulating material as carrier to give a capsule in which the active ingredient (with or without other carriers) is surrounded by carrier, which is thus in association with it. Similarly cachets are included.

Sterile liquid form compositions include sterile solutions, suspensions, emulsions, syrups and elixirs. The active ingredient can be dissolved or suspended in a pharmaceutically acceptable sterile liquid carrier, such as sterile water, sterile organic solvent or a mixture of both. The active ingredient can often be dissolved in a suitable organic solvent, for instance aqueous propylene glycol or polyethylene glyocl solutions. Aqueous propylene glycol containing from 10 to 75% of the glycol by weight is generally suitable. In other instances compositions can be made by dispersing the finely-divided active ingredient in aqueous starch or sodium carboxymethyl cellulose solution, or in a suitable oil, for instance arachis oil.

Preferably the pharmaceutical composition is in unit dosage form, the composition is sub-divided in unit doses containing appropriate quantities of the active ingredient; the unit dosage form can be a package composition, the package containing specific quanties of compositions, for example packeted powders or vials or ampoules. The unit dosage form can be a capsule, cachet or tablet itself, or it can be the appropriate number of any of these in packaged form. The quantity of active ingredient in a unit dose of composition may be varied or adjusted from 5 mg. or less to 500 or more, according to the particular need and the activity of the active ingredient. The invention also includes the compounds in the absence of carrier where the compounds are in unit dosage form.

Compounds of formula I have been shown to possess pharmacological activity e.g. anti-ulcer activity. The anti-ulcer activity was determined by the method of Brodie and Hanson, Gastroenterology 15, 1, 1960. In this test 4-mercapto-1-methyl-3-thiocarboxamido piperidine, which can also be named 4-mercapto-1-methylthionipecotamide displayed particularly good activity. A useful form of this compound is its hydrochloride salt.

The anti-ulcer compositions of the invention will be administered orally in either liquid or solid composition form. These compositions may include one or more antacid ingredients e.g. aluminum hydroxide, magnesium hydroxide or bismuth carbonate, aluminum glycinate, calcium carbonate, magnesium trisilicate, sodium bicarbonate or the alumina gel described in British Specification No. 1,284,394.

The invention also includes novel compounds of formula I and the acid addition salts thereof wherein R, X and Y are as defined above, with the proviso that when Y is cyano and X is absent, $R^1$ is an alkyl, aryl or aralkyl group, any of which may be substituted and when Y is cyano and X is present then X is the group $SR^3$ where $R^3$ is as defined above, except hydrogen.

The preferred novel compounds are those of the formula II

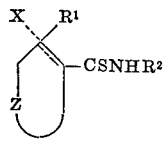

(II)

and their acid addition salts therein Z, X, $R^1$ and $R^2$ are as defined above. These compounds can also be represented by formulae

I

Ia 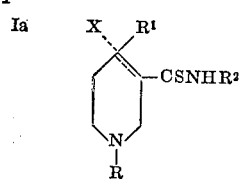 IIb 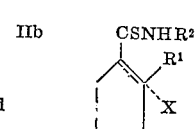

wherein X, R, $R^1$ and $R^2$ and the dotted lines have the same significance as discussed in connection with formula I. Preferably X is $SR^3$ wherein $R^3$ is as defined above and $R^1$ is hydrogen.

Other novel compounds of the invention can be represented by the formula III

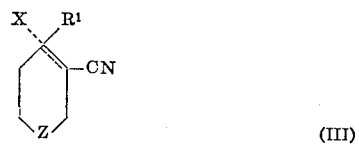

(III)

wherein the dotted lines in the ring indicate an optional double bond, X, which is present only when the ring is saturated, is $SR^3$ and $R^3$, R, $R^1$ and Z are as defined in connection with formula (I), except that $R^3$ is not hydrogen, and when X is absent $R^1$ is an alkyl, aryl or aralkyl group any of which may be substituted, and their acid addition salts. These compounds of formula (III) are primarily useful as intermediates for the preparation of compounds of formula (II), but also possess anti-ulcer activity. They are generally less potent than the corresponding thioamides of formula II. However, 1-benzyl-1,2,5,6-tetrahydro - 4 - methylnicotinonitrile has good activity in the test procedure mentioned above.

The compounds of formula I may be prepared by various methods and the invention includes methods of preparing the novel compounds of formula I (i.e. those of formula II and III). The thioamides of formula II, wherein X is SH, $R^1$ and $R^2$ are hydrogen may be prepared by treating the corresponding nitrile with two moles of hydrogen sulphide in a suitable solvent, e.g. pyridine, in the presence of a catalyst such as a tertiary amine e.g. triethylamine. The thioamides of formula II, wherein $R^2$ is hydrogen and X is $SR^3$ where $R^3$ is other than hydrogen, may be prepared by treating the nitrile (IV)

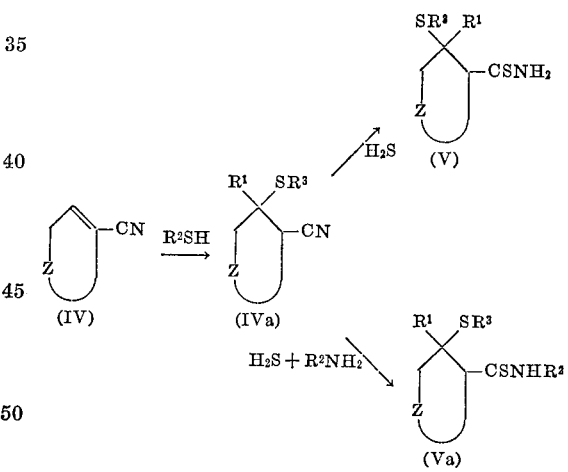

wherein Z is

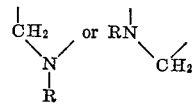

wherein R is an alkyl or aralkyl group (either of which may be substituted) or an acyl group, $R^1$ is hydrogen, or an alkyl, aryl or aralkyl group any of which may be substituted, with a thiol compound $R^3SH$ followed by treating the product (IVa) with 1 mole of hydrogen sulphide in a suitable solvent e.g. pyridine in the presence of a catalyst such as a tertiary amine e.g. triethylamine to give compound (V). The thioamide of formula II wherein $R^2$ is other than hydrogen may be obtained by conducting the above hydrogen sulphide reaction in the presence of a primary amine $R^2NH_2$ to give compound Va. The compound of formula (IVa) where $R^1$ is other than hydrogen and $R^3$ is hydrogen can be obtained by treatment of the nitrile (IV) where $R^1$ is other than hydrogen with $H_2S$. The reaction can be carried out in the presence of a suitable catalyst e.g. a tertiary amine such as triethylamine and a solvent e.g. pyridine.

An alternative method for preparing compounds of formula II, where X is absent, comprises reacting a nitrile of formula (VI) with a thioamide of formula

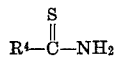

where $R^4$ is an alkyl group, e.g. a lower alkyl group of 1–6 carbon atoms, preferably a methyl group, in dimethyl formamide saturated with hydrogen chloride. The product obtained is a compound of formula (VII) desired, in addton to the employment of an onzng rada-

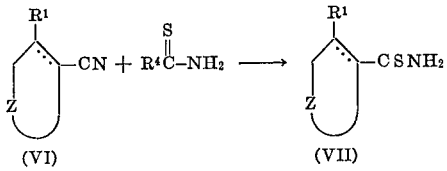

in formulae (VI) and (VII) Z, R and $R^1$ are as defined in connection with formula I.

A compound of formula VII wherein the ring is saturated or unsaturated where $R^1$ is alkyl, aralkyl or aryl can also be prepared by treatment from the corresponding nitrile (VI) where the ring is saturated or unsaturated where $R^1$ is alkyl, aralkyl or aryl, by treatment with $H_2S$ using solvents and catalysts of the type already described. Corresponding compounds where a $CSNHR^2$ group is present may be obtained by conducting the $H_2S$ reaction in the presence of an amine $R^2NH_2$ where $R^2$ is alkyl, aryl or aralkyl.

A further process of the invention comprises reacting a carboxamide of formula (VIII) with phosphorus pentasulphide to obtain a thioamide of formula (IX)

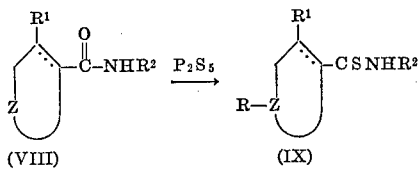

in these formulae Z, $R^1$ and $R^2$ are as defined in connection with formula I and R is an alkyl or aralkyl group either of which may be substituted. The reaction can be carried out in a suitable inert solvent such as a high boiling hydrocarbon, e.g. xylene. The carboxamide (VIII) can be prepared from the nitrile (VI) by a standard hydrolysis procedure for example by treatment with concentrated sulphuric acid at 0° C. followed by neutralisation with ammonia and the group $R^2$ if other than hydrogen can be introduced by an alkylation procedure.

Another process of preparing compounds of formula (II) comprises reacting an alkyl thiocompound of formula (X), where Z, X, $R^1$ and R are as defined in connection with formula I, except that R is other than hydrogen with a compound of formula $R^2NH_2$ where $R^2$ is as defined in connection with formula I.

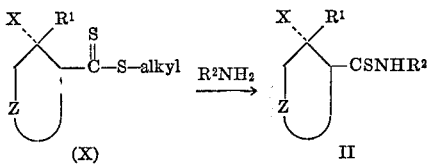

The reaction can be carried out in a suitable solvent e.g. a lower alkanol.

A thioamide of formula II wherein $R^2$ is an alkyl, aryl or aralkyl group can be prepared by alkylation of a corresponding compound where $R^2$ is hydrogen e.g. by treatment with an amine $R^2NH_2$ where $R^2$ is alkyl, aryl or aralkyl.

The nitriles which are starting materials for the thioamides of formula (II), or are novel compounds of formula (III), or are known compounds, may be prepared by reduction of a corresponding 3-cyanopyridine of formula (XI), or a 4-cyanopyridine (XIa) wherein X and $R^1$ are as defined in connection with formula (I), R is alkyl or aralkyl which may be substituted and $Z^\ominus$ is an anion e.g. a halide ion.

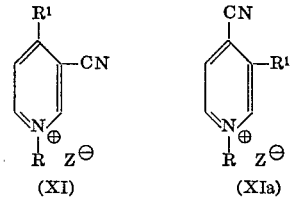

The reduction is conveniently carried out with a borohydride e.g. an alkali-metal borohydride especially sodium borohydride.

Another method of preparing nitriles of formula I or III comprises cyclising an open chain compound in the presence of a basic condensing agent. Any strong base will suffice such as alkalimetal alkoxides e.g. sodium methoxide and ethoxide, sodium amide and Triton B (Benzyltrimethyl ammonium hydroxide). Thus a compound of formula (XII) wherein Z and $R^1$ are as defined in connection with formula I and R is hydrogen,

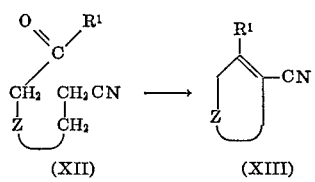

an alkyl or aralkyl group which may be substituted can be cyclised to a compound of formula (XIII). The reaction can be carried out in a suitable inert solvent e.g. benzene and the water removed by azeotropic distillation. Sometimes an intermediate compound of formula (XIV)

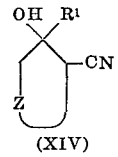

wherein Z, R and $R^1$ are as defined in connection with formula (XII) is formed as a byproduct. This compound can be separated usually by fractional crystallisation but can be further dehydrated by heating to a compound of formula (XIII) if desired. Often distillation of the crude product of the cyclisation reaction will suffice to effect dehydration of XIV. Alternatively XIV can be used to prepare corresponding thioamides of formula II where X is hydroxy by one of the processes disclosed above. The invention also includes the preparation of a nitrile of formula (XIII) by dehydration of a hydroxy compound of formula (XIV). Compounds of formula (XIV) where $R^1$ is hydrogen can be prepared by treating a 1,2,5,6-tetrahydropyridine (XVII) with a strong acid in aqueous solution to product a tautomeric mixture of the hexahydropyridine (XVIII) and 1,2,5,6-tetrahydropyridine (XIX) followed by alkalimetal borohydride reduction to yield the hydroxyhexahydropyridine (XX).

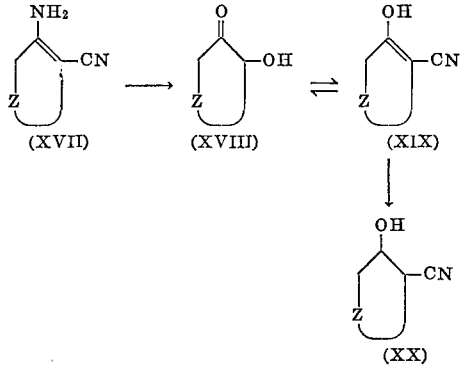

The steps XVII→XVIII and XIX are conveniently carried out in a dilute aqueous solution of a strong mineral acid e.g. hydrochloric acid or hydrobromic acid.

A nitrile in which R is alkyl or aralkyl may be prepared by alkylation of a corresponding compound where R is hydrogen using standard alkylating conditions. Thus a compound of formula (XV) wherein Z and R¹ are as defined in connection with formula I and R forming part of Z is hydrogen can be alkylated.

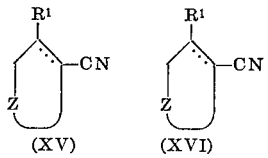

to give a compound of formula (XVI) wherein R (forming part of Z) is alkyl or aralkyl. The starting compound of formula (XV) when the double bond is absent can be prepared by hydrogenation of the corresponding N-benzyl compound. Alternatively compound (XV) can be obtained from (XII) as defined above, where R is hydrogen. A compound of formula (XVI) where R is acyl can be prepared by acylation of a compound of formula (XV) wherein R of the Z group is hydrogen using standard acylating conditions.

Compounds of formula (II) where R¹ is hydrogen and X is hydroxy may be prepared from compound (XVIII), (XIX) or (XX) which may be etherified or esterified and any of these nitriles (XVIII to XX) can be converted to a thioamide of the invention by one of the methods discussed above.

Methods of preparing the novel nitriles of the invention are also included in the invention.

The following examples illustrate the invention:

Example 1

3-Cyano-1-methyl-1,2,5,6-tetrahydropyridine hydrochloride

The title compound was prepared from 1-methyl-3-cyanopyridinium iodide by reduction with sodium borohydride, according to Helv. Chim. Acta. 1959, 42, 1960–70, and obtained in 30% yield b.p. 98–100° C./15 mm. Hg. The hydrochloride was prepared by dissolving the free base (1 g.) in dry ether (50 ml.) and treating with dry hydrogen chloride gas for 5 minutes with cooling. The solid was filtered and recrystallised from ethanol-diethylether as colourless needles m.p. 227° C. Found: C, 53.10; H, 6.90; N, 17.7. $C_7H_{10}N_2HCl$ requires: C, 53.04; H, 7.01; N, 17.70%.

EXAMPLE 2

4-Mercapto-1-methyl thionipecotamide

A solution of 3-cyano-1-methyl-1,2,5,6-tetrahydropyridine (10.9 g. 0.09 m.) in dry pyridine (274 g.) was treated with triethylamine (4.54 g.) saturated with hydrogen sulphide (5 hours) sealed in a stainless steel bomb and heated at 50° C. for 12 hours. Removal of the volatile material in vacuo and recrystallisation of the residue from absolute alcohol gave the title compound as pale yellow needles (6 g., 40%) m.p. 166° C. Found: C, 44.6; H, 7.5; N, 14.9. $C_7H_{14}N_2S_2$ requires: C, 44.2; H, 7.4; N, 14.7%. This compound can also be named 4-mercapto-1-methyl-3-thiocarboxamidopiperidine.

EXAMPLE 3

1-Methyl-4-phenylmercaptonipecotonitrile

A mixture of 3-cyano-1-methyl-1,2,5,6-tetrahydropyridine (6.1 g. 0.05 m.) thiophenol (5.50 g., 0.05 m.) and pyridine (1 ml.) were stirred at room temperature for 1 hour, diluted with dioxan (7 ml.) and heated at 110° with stirring for 24 hours. The solvent was removed in vacuo and the residual brown oil diluted with benzene (100 ml.) washed with N/1 hydrochloric acid (3× 25 ml.) and the combined washings made basic, with 2 N sodium hydroxide and extracted into benzene (3× 25 ml.). The combined extracts were washed with saturated brine, dried ($MgSO_4$) and evaporated to give a residual solid. Recrystallisation from benzene-60/80° petroleumether gave the title compound as colourless plates (8 g., 75%) m.p. 114° C. Found: C, 67.42; H, 6.97; N, 11.99. $C_{13}H_{16}N_2S$ requires: C, 67.21; H, 6.94; N, 12.06%.

EXAMPLE 4

(A) N-Benzyl-N(2-cyanoethyl)-β-aminopropiophenone

N-Benzyl-2-cyanoethylamine was prepared from acrylonitrile (53 g.) and benzylamine (107 g.) according to the method of Frost et al. (J.O.C. 1950, 15, 51–3 and isolated as a colourless oil (117 g., 70%) b.p. 108–10° C./ 0.001 mm. Hg.

N-Benzyl-2-cyanoethylamine (16 g., 0.1 m.) was added over 5 minutes to a solution of β-bromopropiophenone (prepared by method of Oae et al. J.A.C.S. 1956, 4,030) (10.2 g., 0.05 m.) in benzene (7 ml.) and chloroform (2 ml.) and the mixture refluxed for 18 hours. The solid (N-benzyl-2-cyanoethylamine hydrobromide) was filtered, washed with benzene and the combined filtrate warmed with N/10 hydrochloric acid. The washings were made basic with 2N sodium hydroxide and extracted into ether (3× 100 ml.) and the combined extracts washed with saturated brine, dried ($MgSO_4$) and evaporated to a colourless oil (9.2 g., 40%) b.p. 130°C/0.005 mm. Hg. The hydrochloride was prepared by dissolving the product (1 g.) in dry ether (50 ml.) and treating with dry HCl gas for 5 minutes with cooling. The solid was filtered and recrystallised from ethanol-diethylether as colourless needles m.p. 80° C. (Found: C, 67.10; H, 6.64; N, 8.80. $C_{19}H_{21}N_2OCl$ requires: C, 67.40; H, 6.57; N, 8.36%).

(B) 1-Benzyl-3-cyano-4-phenyl-1,2,5,6-tetrahydropyridine

Dry, powdered sodium ethoxide [prepared from sodium (2.07 g. 0.09 m.) and ethanol (4.14 g., 0.09 m.)] was added portionwise to a solution of N-benzyl-N-(2-cyanoethyl)β-aminopropiophenone (26.08 g., 0.09 m.) in dry benzene (180 ml.) in a flask fitted for downward distillation. The reaction mixture was heated gently until the benzene-ethanol azeotrope distilled. The remaining benzene was removed and the residue diluted with water (50 ml.) and extracted into ether (3× 100 ml.). The combined ethereal extracts were washed with saturated brine, dried ($MgSO_4$) and the solvent removed in vacuo to give a residual solid which recrystallised from benzene-petrol (60–80° C.) to give the title compound as pale yellow needles (9.1 g., 43%) m.p. 105° C. Found: C, 83.14; H, 6.74; N, 10.27. $C_{19}H_{18}N_2$ requires: C, 83.20; H, 6.62; N, 10.21%.

EXAMPLE 5

1-Benzyl-3-thiocarboxamido-4-phenyl-1,2,5,6-tetrahydropyridine

A solution of 1-benzyl-3-cyano-4-phenyl-1,2,5,6-tetrahydropyridine (3.7 g.) in pyridine (148 g.) and triethylamine (43.6 g.) was saturated with hydrogen sulphide for 5 hours and then heated at 50° C. in a stainless steel bomb for 12 hours. Removal of the volatile material in vacuo gave an off-white solid which on recrystallisation from benzene gave the title compound as colourless needles (2.5 g., 56%) m.p. 163° C. Found: C, 74.40; H, 6.63; N, 8.84; S, 10.19. $C_{19}H_{20}N_2S$ requires: C, 74.10; H, 6.49; N, 9.05; S, 10.40%.

EXAMPLE 6

(A) 1-Acetyl-3-cyano-4-hydroxypiperidine

A mixture of di(2-cyanoethyl)amine (25 g.), naphthalene (25 g.), sodium (2 g.) in dioxane (400 ml.) was refluxed under nitrogen for 22 hours and the hot reaction mixture poured onto benzene (1 litre), allowed to cool and the excess sodium destroyed with methanol. The solid was collected by filtration and dried giving 3-cyano-4- iminopiperidine (17 g.) which was suspended in pyridine (150 ml.) and treated dropwise with acetic anhydride (75 ml.) with ice cooling. After 30 minutes at 0° C. the resultant solid was filtered, washed with toluene and ether giving 1-acetyl-3-cyano-4-iminopiperidine (10 g.) which was dissolved in 2.5N HCl (50 ml.) and allowed to stand at 25° C. for 30 mins. The pH was adjusted to 7.0 with 2.5 N sodium hydroxide and the solution evaporated to dryness in vacuo. The residue was acidified to pH 4.0 with 2.5N HCl and evaporated to dryness. Trituration with acetone gave 1-acetyl-3-cyano-4-piperidone (7 g.) which was dissolved in water (80 ml.) and treated dropwise with a solution of sodium borohydride (2.1 g.) in water (35 ml.). After allowing the mixture to stand at 25° C. for 10 minutes the excess borohydride was removed by treatment with aqueous acetic acid and the solution evaporated to dryness. The resultant oil was triturated with acetone, filtered and the filtrate evaporated in vacuo to yield 1-acetyl-3-cyano-4-hydroxypiperidine (12 g.) which was used without further purification.

(B) 1-Acetyl-3-thiocarboxamido-4-hydroxypiperidine ethanolate

1-Acetyl-3-cyano-4-hydroxypiperidine was prepared as described in part A. The hydroxynitrile (9.5 g., 0.056 m.) was dissolved in triethylamine (5.7 g., 0.056 m.) and pyridine (140 g.) and treated with hydrogen sulphide for 17 hours at room temperature. The saturated solution was heated in a bomb at 60° C. for 3 days, cooled and the solvent removed in vacuo. The residual solid was recrystallised from ethanol ether giving the title compound as colourless needles (2.5 g.) m.p. 98° C. Found: C, 48.55; H, 8.25; N, 11.11%. $C_8H_{14}N_2O_2S \cdot C_2H_5OH$ requires: C, 48.36; H, 8.12; N, 11.28%.

EXAMPLE 7

1-Methylthionipecotamide

1-Methylnipecotonitrile (3 g.) was dissolved in a mixture of pyridine (3 ml.) and triethylamine (2.5 ml.). The solution was saturated with hydrogen sulphide and kept at room temperature in a sealed flask for 3 days. The solid was filtered, washed with petroleum ether and recrystallised from 90% ethanol to give the title compound as colourless needles (1.2 g., 30%) m.p. 158° C. Found: C, 53.4; H, 9.1; N, 17.8%. $C_7H_{14}N_2S$ requires: C, 53.1; H, 8.9; N, 17.7%.

EXAMPLE 8

1-Methyl-3-mercapto-4-thiocarboxamidopiperidine hydrochloride

1 - Methyl - 4 - cyano - 1,2,5,6 - tetrahydropyridine was prepared from 1 - methyl - 4 - cyanopyridinium iodide according to the method of Liberatore et al. (Tet. Lett. 1971, 26, 2381). The nitrile (5.4 g.) was dissolved in pyridine (6 ml.) and triethylamine (4.4 g.), treated with hydrogen sulphide for 7 hours and allowed to stand at room temperature in a stoppered flask for 12 hours. The solid was filtered, dissolved in 2N hydrochloric acid (5 ml.) diluted with acetone (200 ml.) and the solid filtered. Recrystallisation from ethanol-ether gave the title compound as a white powder (1 g.) m.p. 230° C. (dec.). Found: C, 37.45; H, 6.65; N, 11.98% $C_7H_{14}N_2S_2 \cdot HCl$ requires: C, 37.07; H, 6.67; N, 12.36%.

EXAMPLE 9

4-Mercapto-1-methylthionipecotamide hydrochloride

4 - Mercapto - 1 - methylthionipecotamide (2.0 g.) was dissolved in dilute hydrochloric acid (2 ml.) and diluted with acetone (200 ml.). The solid was filtered and recrystallised from methanol-ether to give the title compound as a pale yellow powder (600 mgs., 32%) m.p. 202° C. Found: C, 37.3; H, 6.8; N, 12.0%.

$C_7H_{14}N_2S_2 \cdot HCl$ requires C, 37.1; H, 6.7; N, 12.3%.

EXAMPLE 10

1-Methyl-N-methylthionipecotamide hemihydrate

1-Methylthionipecotamide (3 g.) was dissolved in 30% aqueous methylamine (15 ml.) and the mixture heated at 80° C. for 10 minutes, cooled, saturated with solid potassium carbonate and extracted with chloroform (3× 50 ml.). The combined extracts were washed with brine, dried and the solvent removed in vacuo. The residual solid was recrystallised from methanol-ether to give the title compond as an off-white powder (1.0 g., 31%) m.p. 135° C. Found: C, 53.3; H, 9.1; N, 15.7%. $C_8H_{16}N_2S \cdot \tfrac{1}{2}H_2O$ requires: C, 53.1; H, 9.4; N, 15.5%.

EXAMPLE 11

1-Benzyl-1,2,5,6-tetrahydro-4-methylnicotinonitrile

A mixture of β-cyanoethylbenzylamine (92 g.), conc. hydrochloric acid (60 ml.), ethanol (120 ml.), paraformaldehyde (30 g.) and acetone (120 ml.) were heated at reflux for 5 hours. The solvent was removed in vacuo and the residue dissolved in water (100 ml.) and washed with ether (2×100 ml.). The aqueous solution was made basic with aqueous potassium carbonate and the solution extracted with ether (3× 100 ml.). The combined extracts were dried and evaporated to give β-cyanoethylbutan-3-one benzylamine (132 g.) which was dissolved in dry benzene (1.3 litre) and sodium methoxide (prepared from sodium (13.2 g.) was added portionwise. The mixture was refluxed for 5 hours and the cooled solution washed with 2N HCl (4× 500 ml.). The combined extracts were made basic with potassium carbonate and extracted into methylene chloride (4× 500 ml.) and the combined extracts dried ($MgSO_4$) and the solvent removed in vacuo. The residual oil was distilled to give 1-benzyl - 3 - cyano-4-methyl - 1,2,5,6 - tetrahydropiperidine as a colourless oil (40 g.) b.p. 136° C./5× $10^{-3}$ mm. Hg which was converted to the hydrochloride by treating an ethereal solution with dry HCl gas. The resultant solid was recrystallised from methanol-ether giving the hydrochloride of the title compound as colourless needles (35 g.) m.p. 172° C. Found: C, 68.0; H, 7.0; N, 11.3%. $C_{14}H_{16}N_2 \cdot HCl$ requires: C, 67.6; H, 6.9; N, 11.3%.

EXAMPLE 12

| Suspension: | Percent w./v. |
|---|---|
| Aluminium hydroxide gel B.P. 5% $Al_2O_3$ | 80%=4% $Al_2O_3$ |
| Magnesia Magma 12% w./v. MgO | 10 |
| 4-Mercapto-1-methylthionipecotamide | 2.0 |
| Glycerin B.P. | 3.0 |
| Alcohol 60 O.P.[1] | 0.08 |
| Peppermint oil B.P. | 0.015 |
| Saccharin sodium B.P. | 0.01 |
| Methyl p-hydroxybenzoate sodium salt | 0.1 |
| Propyl p-hydroxybenzoate sodium salt | 0.02 |
| Butyl p-hydroxybenzoate sodium salt | 0.01 |
| Water q.s. ad. | 100.00 |

[1] O.P. denotes overproof. 60 O.P. represents 91% w./v. Ethanol/water.

The above suspension is prepared by the following procedure. Add to the Alumina gel Magnesia Magma followed by the 4-mercapto-1-methyl-thionipecotamide dispersed in glycerin, the peppermint oil dissolved in alcohol, the saccharin sodium dissolved in water, and the p-hydroxybenzoates dissolved in water. Make up to volume with water and stir well. Dose: 5 ml. t.d.s.

EXAMPLE 13

Antacid Tablet (chewable)

| | Mg. |
|---|---|
| Saccharin | 1.0 |
| Hydrated alumina sucrose powder | 750.0 |
| 3 - cyano - 1 - methyl-1,2,5,6-tetrahydropyridine hydrochloride | 100.0 |
| Mannitol B.P. | 170.0 |

|  | Mg. |
|---|---|
| Maize starch B.P. dried | 30.0 |
| Talc. purified B.P. | 28.0 |
| Magnesium stearate B.P. | 20.0 |
| Peppermint oil B.P. | 1.0 |
|  | 1080.0 |

Antacid tablets of the above formulation are prepared by the following procedure:

Triturate peppermint oil with talc (screen 40 mesh).
Add the triturate, and other ingredients to a blender and mix thoroughly.
Slug the powder to large hard slugs.
Granulate the slugs through a 14 mesh screen.
Compress the granules on a suitable compression machine to give tablets of the required size.

EXAMPLE 14

Anti-ulcer tablet (without antacid)

|  | Mg./tablet |
|---|---|
| 4-Mercapto-1-methyl thionipecotamide | 100 |
| Celutab | 147.5 |
| Mag. Stearate | 2.5 |
|  | 250.0 |

The tablets are prepared by the following method. Blend the ingredients in a suitable blender. Compress the blended ingredients on a suitable compression machine to form tablets of the above composition.

Celutab is a commercial product comprising 90–2% dextrose, 3–5% maltose remainder higher glucose saccharides. Spray crystallised.

EXAMPLE 15

A suspension is prepared as described in Example 12 except that 4-mercapto-1-methylthionipecotamide is replaced by its hydrochloride salt.

EXAMPLE 16

Anti-ulcer tablets are prepared as described in Example 14 except that 4-mercapto-1-methylthionipecotamide is replaced by its hydrochloride salt.

I claim:
1. A compound selected from the group consisting of: (1) 1,3,4-trisubstituted piperidines having the formula

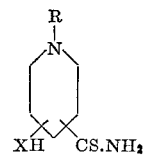

wherein R represents methyl or acetyl and X represents oxygen or sulfur, with the proviso that the —XH substituent is in either the 3- or 4-position and the —CS.NH$_2$ substituent is in the other of the 3- and 4-positions, and (2) the pharmaceutically acceptable salts of such substituted piperidines.

2. 4-mercapto-1-methyl-thionipecotamide.

3. 4-mercapto-1-methyl-thionipecotamide hydrochloride.

4. 1 - methyl-3-mercapto-4-thiocarboxamidopiperidine hydrochloride.

5. 1-acetyl-3-thiocarboxamido-4-hydroxypiperidine.

References Cited

Gardner et al.: J. Org. Chem. 22, 984–6 (1957).

G. THOMAS TODD, Primary Examiner

U.S. Cl. X.R.

260—293.51, 293.65, 293.73, 293.75, 240 A, 240 J, 294.8 E, 294.9; 424—263, 267